(12) United States Patent
Cordeiro et al.

(10) Patent No.: US 9,632,968 B2
(45) Date of Patent: Apr. 25, 2017

(54) IMPLEMENTING AN INTER-PROCESSOR COMMUNICATION IN A MULTI-CORE SYSTEM USING MMWAVE RADIOS

(75) Inventors: Carlos Cordeiro, Portland, OR (US); Guoqing Li, Portland, OR (US); Bahareh Sadeghi, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 475 days.

(21) Appl. No.: 13/993,212

(22) PCT Filed: Dec. 15, 2011

(86) PCT No.: PCT/US2011/065131
§ 371 (c)(1),
(2), (4) Date: May 8, 2014

(87) PCT Pub. No.: WO2013/089736
PCT Pub. Date: Jun. 20, 2013

(65) Prior Publication Data
US 2014/0244870 A1      Aug. 28, 2014

(51) Int. Cl.
G06F 13/00         (2006.01)
G06F 13/42         (2006.01)
(Continued)

(52) U.S. Cl.
CPC .......... *G06F 13/42* (2013.01); *G06F 15/163* (2013.01); *G06F 15/167* (2013.01)

(58) Field of Classification Search
CPC ........ G06F 13/36; G06F 13/385; G06F 13/40; G06F 13/4004
(Continued)

(56) References Cited

U.S. PATENT DOCUMENTS

2004/0117511 A1    6/2004  Arimilli et al.
2009/0178057 A1    7/2009  Gazda et al.
(Continued)

FOREIGN PATENT DOCUMENTS

WO    2013/089736 A1    6/2013

OTHER PUBLICATIONS

International Search Report and Written Opinion received for PCT Patent Application No. PCT/US2011/065131, mailed on Aug. 27, 2012, 9 pages.
(Continued)

*Primary Examiner* — Glenn A Auve
*Assistant Examiner* — Kim T. Huynh
(74) *Attorney, Agent, or Firm* — Ellis B. Ramirez; Prass LLP

(57) ABSTRACT

A system and method are provided that implement the use of mmWave directional communications to replace wired interconnects for inter-processor communication in multi-core computing systems. Using highly directional, low interference mmWave transmissions in the 60 GHz frequency range, an alternative interconnect scheme is provided to support inter-processor communication in multi-core computing systems for operations and testing. Wired interconnects between the multiple cores and a bus interface are replaced with cooperating mmWave transmitting/receiving devices on each of the core side and the bus interface side. The ability to transmit and receive separate high data rate, directional low interference signals for individual core communication is thus facilitated between the bus interface and each of the multiple cores in the multi-core computing system.

16 Claims, 4 Drawing Sheets

(51) Int. Cl.
*G06F 15/163* (2006.01)
*G06F 15/167* (2006.01)

(58) Field of Classification Search
USPC ................................ 710/100, 313, 305–306
See application file for complete search history.

(56) References Cited

U.S. PATENT DOCUMENTS

| | | | |
|---|---|---|---|
| 2010/0250821 A1* | 9/2010 | Mueller | G06F 13/387 710/313 |
| 2011/0191484 A1 | 8/2011 | Babbar et al. | |
| 2012/0057536 A1* | 3/2012 | Verma | H04W 72/0453 370/329 |

OTHER PUBLICATIONS

International Preliminary Report on Patentability and Written Opinion received for PCT Patent Application No. PCT/US2011/065131, mailed on Jun. 26, 2014, 6 pages.

\* cited by examiner

IMPLEMENTING AN INTER-PROCESSOR COMMUNICATION IN A MULTI-CORE SYSTEM USING MMWAVE RADIOS

BACKGROUND

1. Field of the Disclosed Embodiments

This disclosure relates to systems and methods for employing millimeter wave (mmWave) transmitter/receivers (radios) for inter-processor or inter-core communication in multi-core systems.

2. Related Art

The wireless communication industry, more than a decade ago, began to focus on the mmWave region of the radio-frequency (RE) spectrum for wireless communication based on unique characteristics with regard to energy propagation for wireless transmissions in this region of the RE spectrum.

Wireless mmWave communications, particularly those in the 60 GHz frequency range, experience a high level of atmospheric RE energy absorption. Understanding that the transmitted RE energy in this frequency region would be quickly absorbed by oxygen molecules in the atmosphere over long distances, wireless technology developers began to focus on this characteristic as a benefit for certain applications.

Previously, the high levels of atmospheric absorption and resultant range limitations were viewed as rendering mmWave technologies unsuitable for certain wireless applications. That trend and thinking have reversed. There has emerged a need for short-range, focused transmission paths that can support high rates of data communication to a number of beneficial uses. Wireless mmWave communication technologies, and particularly 60 GHz mmWave communication systems, present a solution to meet the emerging need.

The unique characteristic of limited energy propagation in an oxygen atmosphere for transmissions in the mmWave region of the RF spectrum and the need, therefore, to provide directional transmission and reception for these communications presents significant benefits such as increased immunity to interference for transmitter/receiver systems in comparatively close proximity to one another. Transmitting in the mmWave region of the RE spectrum results in a fairly focused beam as compared to transmitting in lower frequency ranges. It is this pencil beam transmission capability combined with high energy absorption outside the narrow transmission beam that provides the unique ability to reuse a same frequency in a comparatively localized region thus making it possible to operate multiple transmitter and receiver combinations on the same frequency, or nearly the same frequency, in close proximity to one another with very low likelihood of interference.

Another benefit of the use of mmWave communication lies in the relationship between signal wavelength and antenna size. Transmitters and receivers operating in the mmWave region use high-gain antennas to focus as much of the transmitted signal as possible onto the receiving antenna, thereby overcoming the effects of atmospheric absorption in the pencil beam between the transmitter and the receiver. Those of skill in the art recognize that, with an increase in RF frequency, wavelength decreases. This makes it possible to produce required gains with smaller antennas. Thus, in mmWave communications, compact, low-cost antennas can be used to achieve a highly focused beam. This architecture results in the emissions from a mmWave radio via a high-gain/narrow beam antenna being very narrow and focused. Point-to-point radios should have highly directional antennas in order that all the transmitted energy is directed just at the intended recipient. Highly focused antennas minimize the possibility of interference and maximize performance.

The above advantages have now been recognized as a first generation of mmWave, such as 60 GHz, wireless communication systems is in the process of being standardized as, for example, the proposed IEEE 802.11ad/WiGig standard. A broad spectrum of products that support mmWave wireless communication are being developed and manufactured.

A large percentage of computing platforms today employ multi-core technologies. The term "multi-core systems" generally refers to a single computing platform with two or more independent processors, referred to as "cores." It is these processors or "cores" that are the actual units that execute the various applications based on program instructions in the computing platforms. At a basic level, having multiple cores in a computing platform makes it possible for the computing platform to execute multiple individual instructions at the same time. This capability results in increasing overall speed for applications and programs that support parallel processing among the two or more cores. This benefit can be enhanced by increasing the number of cores in the computing platform.

In virtually all current implementations of multi-core computing systems, inter-core communication is achieved through wired busses and implemented in a specific memory scheme. FIG. 1 illustrates a typical conventional multiple core installation including wired interconnects for inter-core communication. As shown in FIG. 1, a typical inter-core communication scheme includes each of multiple CPU cores 110A-X, and associated Level 1 caches, being connected by individual wired busses 150A-X to a wired bus interface 130 having (1) X ports to accommodate the individual wired busses 150A-X, and (2) Level 2 caches.

As a number of cores and wired interconnects increases in multi-core systems, so to do difficulties associated with the use of wired interconnects. There are a number of factors that make the use of wired interconnects an increasing problem for multi-core systems.

Principal among the difficulties that make wired interconnects a problem is that, with the increasing numbers of cores in multi-core systems, the interconnect logic between the cores, e.g., the busses, becomes increasingly complex. This difficulty becomes particularly acute in instances where, before a multi-core system become commercially viable or available, it must undergo extensive and costly testing. This testing itself involves extensive time and effort in interconnecting the multiple cores for the sole purpose of testing the cores themselves and the inter-core communication between cores. This testing process is becoming even more complex as the cores themselves, and therefore inter-connects between those cores, become more complex. For low cost, low power and low rate multi-core systems, having a complex and costly wired interconnect scheme is undesirable.

SUMMARY OF THE DISCLOSED EMBODIMENTS

It would be advantageous to find an economical alternative to the use of the increasingly complex, time intensive and costly wired interconnects for inter-processor or inter-core communication in multi-core systems.

The directionality of mmWave, e.g., 60 GHz, beam-formed transmissions may provide such an economic alternative for inter-core communication. Because mmWave transmissions are highly directional, with beamwidths on the order of 5-30 degrees, it may be possible to create pointto-point links that allow direct inter-core communication avoiding the complex wired interconnect process altogether.

Due to the short distances between cores in multi-core systems, achievable data rates may be very high, for example, on the order of 6-7 Gbps and above.

Also, inter-core communication power consumption can be very low due to the short distances involved.

In various exemplary embodiments, the systems and methods according to this disclosure may implement the use of mmWave directional communications to replace wired interconnects for inter-core communication in multi-core computing systems.

In various exemplary embodiments, the systems and methods according to this disclosure may take advantage of the highly directional, low interference nature of mmWave transmissions in the 60 GHz frequency range to provide alternative inter-core communication in multi-core computing systems.

In various exemplary embodiments, the systems and methods according to this disclosure may replace wired interconnects between the multiple cores and a bus interface with cooperating mmWave transmitting/receiving devices on each of the core side and the bus interface side for each core in the multi-core computer system. Accordingly, an ability to transmit and receive separate high data rate, directional low interference signals for individual core communication may be facilitated between the bus interface and each of the multiple cores in the multi-core computer system.

In various exemplary embodiments, systems method according to this disclosure may address an increasing problem based on the proliferation of increasingly complex multi-core computing systems in providing a low cost, less complex manner by which to interconnect multiple cores for testing and operation using multi-Gbps, mmWave wireless communication.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for employing mmWave radios for inter-processor or inter-core communication in multi-core computing systems will be described, in detail, with reference to the following drawings, in which.

DETAILED DESCRIPTION OF THE DISCLOSED EMBODIMENTS

The systems and methods for employing mmWave radios for inter-processor or inter-core communication in multi-core computing systems will generally refer to this specific utility for those systems and methods. Exemplary embodiments described and depicted in this disclosure should not be interpreted as being specifically limited to any particular configuration, or directed to any particular intended use. In fact, close proximity, high data rate wired communication interconnection systems that may benefit from replacing one or more of the wired interconnects with a highly directional, high data rate wireless connection involving cooperating mmWave transmitter/receiver devices is contemplated.

Specific reference to, for example, any particular communication device, including specifically cooperating wireless communicating devices operating in the mmWave, and particularly 60 GHz, region of the RF spectrum, should be understood as being exemplary only, and not limiting, in any manner, to any particular class of devices. The systems and methods according to this disclosure will be described as being particularly adaptable to the above-described function, but should not be considered as being limited to only this function.

Individual features and advantages of the disclosed systems and methods will be set forth in the description that follows, and will be, in part, obvious from the description, or may be learned by practice of the features described in this disclosure. The features and advantages of the systems and methods according to this disclosure may be realized and obtained by means of the individual elements and method steps, and combinations of those elements and method steps, as particularly pointed out in the appended claims. While specific implementations are discussed, it should be understood that this is done for illustration purposes only. A person skilled in the relevant art will recognize that other components and configurations may be used without departing from the spirit and scope of the subject matter of this disclosure.

Various aspects of the disclosed embodiments relate to a system and a method for employing mmWave radios for inter-processor or inter-core communication in multi-core computing systems, as well as a corresponding non-transitory computer-readable medium having recorded on it a program that, when executed by a processor, causes the processor to execute the steps of the method for employing mmWave radios for inter-processor or inter-core communication in multi-core computing systems.

Figure 1:
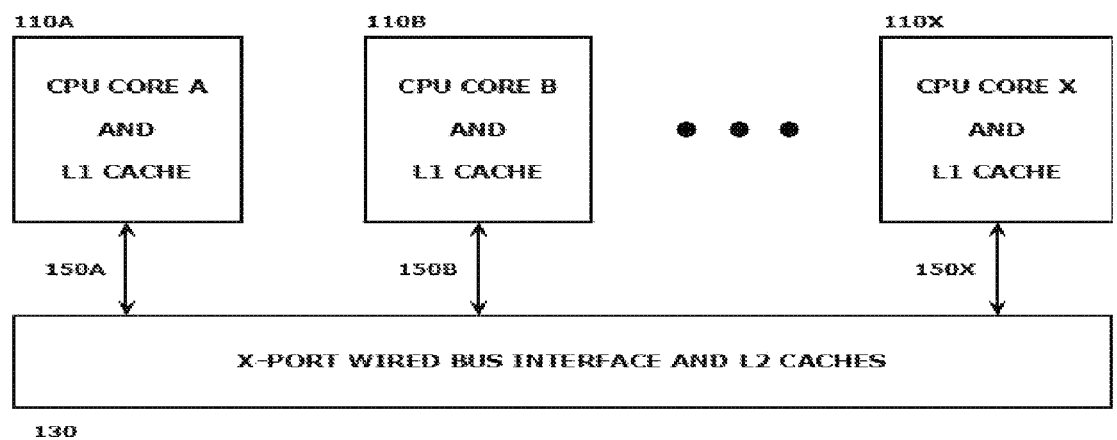
FIG. 1 illustrates a typical conventional multiple core installation including wired interconnects for inter-core communication.
Figure 2:
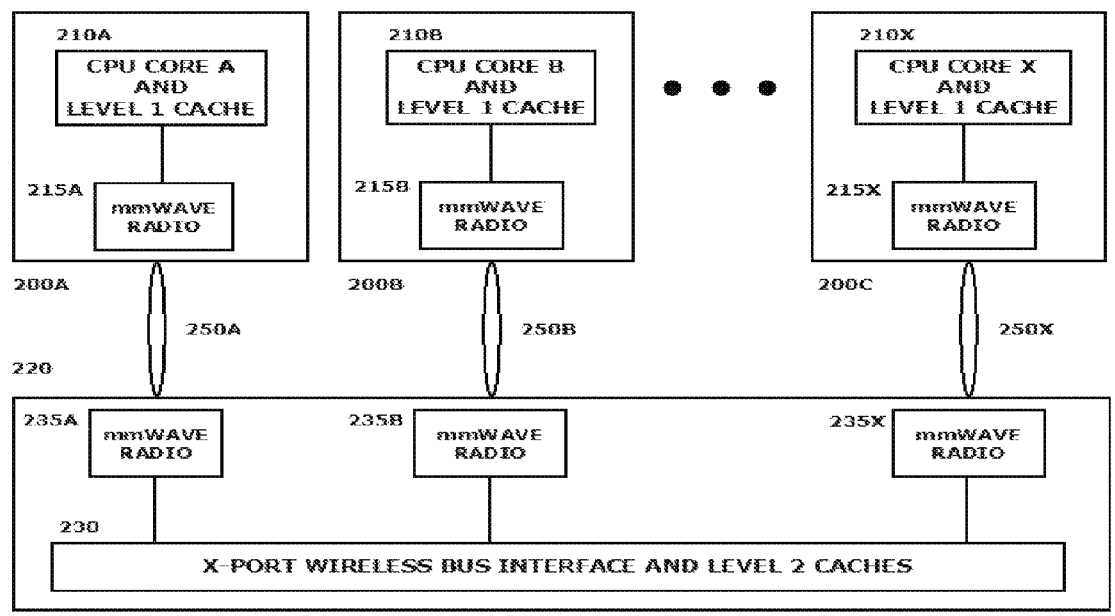
FIG. 2 illustrates an exemplary overview of an interconnect configuration using mmWave transmitter/receiver devices to replace wired interconnects for inter-core communication in a multiple core computing system according to this disclosure.

FIG. 2 illustrates an exemplary overview of an interconnect configuration using mmWave transmitter/receiver devices to replace wired interconnects for inter-core communication in a multiple core computing system according to this disclosure. As shown in FIG. 2, an exemplary interconnect configuration according to this disclosure is significantly different from that shown in FIG. 1.

Multiple CPU units 200A-X may each include an individual CPU core 210A-X, and associated Level 1 cache. Further, each of the multiple CPU units 200A-X may include at least one mmWave transmitter/receiver (radio) 215A-X that communicates directly with a respective CPU core 210A-X. Each individual mmWave transmitter/receiver 215A-X may be in wired or wireless communication with the individual CPU core 210A-X that it supports within the individual CPU unit 200A-X.

On an interface side, a wireless bus interface unit 220 may include at least one wireless bus interface 230. The wireless bus interface 230 may include X interface ports and Level 2 caches. It should be noted that the number of interface ports need not necessarily correspond to the number of multiple CPU units 200A-X.

It is anticipated that the number of interface ports in the wireless bus interface 230 will generally be selected to be equal to or larger than a number of individual CPU units 200A-X that the wireless bus interface 230 is intended to support. If installed, for example, in a commercially distributed multi-core computer system, it is anticipated that there would be a one-to-one correspondence between a number of interface ports in the wireless bus interface 230, when there is no reasonable manner by which the multi-core computer system may be modified to add additional cores. Otherwise, extra ports may be included in the wireless bus interface 230 in order to account for future system growth.

Alternatively, if the wireless bus interface 230 is installed, for example, in a computing system that is set up to test inter-core communication between multiple cores prior to being made commercially available, such as, for example, being installed in a commercially available multi-core computing system, it is anticipated that a number of wireless bus interface ports may be included in a single wireless bus interface 230, or in multiple such bus interfaces, that would accommodate a maximum number of anticipated multiply interconnected cores, in order to test a complete inter-core connection and communication scheme prior to installing the cores in a commercially available multi-core computing system. The connection topology among the cores could be a fully connected mesh, wherein there is a dedicated mmWave wireless radio front a core to every other core.

Regardless of a number of ports in the wireless bus interface 230, and as is generally depicted in FIG. 2, each of the ports will have associated with it a mmWave transmitter receiver (radio) 235A-X. It is anticipated that each of the mmWave transmitters/receivers 235A-X will be available to establish wireless communication with a corresponding one of the mmWave transmitters/receivers 215A-X in each of the multiple CPU units 200A-X. In each instance, one of the CPU side mmWave transmitters/receivers 215A-X and the interface side mmWave transmitters/receivers 235A-X will establish directional wireless communication via a number of direct beamformed mmWave wireless communication links 250A-X with a corresponding other one of the CPU side mmWave transmitters/receivers 215A-X and the interface side mmWave transmitters/receivers 235A-X.

Each of the established mmWave wireless communication links may transmit on a same frequency or a different frequency, for example, in the 60 GHz frequency range. An advantage of the use of mmWave wireless communication links 250A-X is their directionality thereby reducing the chance for interference between adjacent cooperating pairs of CPU side mmWave transmitters/receivers 215A-X and the interface side mmWave transmitters/receivers 235A-X. An additional advantage is the rate of wireless data communication, which is in a range of in excess of 6 Gbps.

It should be appreciated that the depiction in FIG. 2 is exemplary only and not intended to be limiting as an only configuration available for the disclosed system. For example, as indicated briefly above, there may be multiple interfaces including same numbers of cooperating CPU side mmWave transmitters/receivers 215A-X and the interface side mmWave transmitters/receivers 235A-X, or larger numbers on the interface side than on the CPU side. These may be arranged as individual or multiple integral units, or as combinations of sub-systems including individual components or combinations of components, integral to a single unit, or as multiple units in wired or wireless communication with each other. In other words, no specific configuration as an integral unit, as a support unit or as multiple individual units, for the depicted configuration is to be implied by the depiction in FIG. 2.

Figure 3:
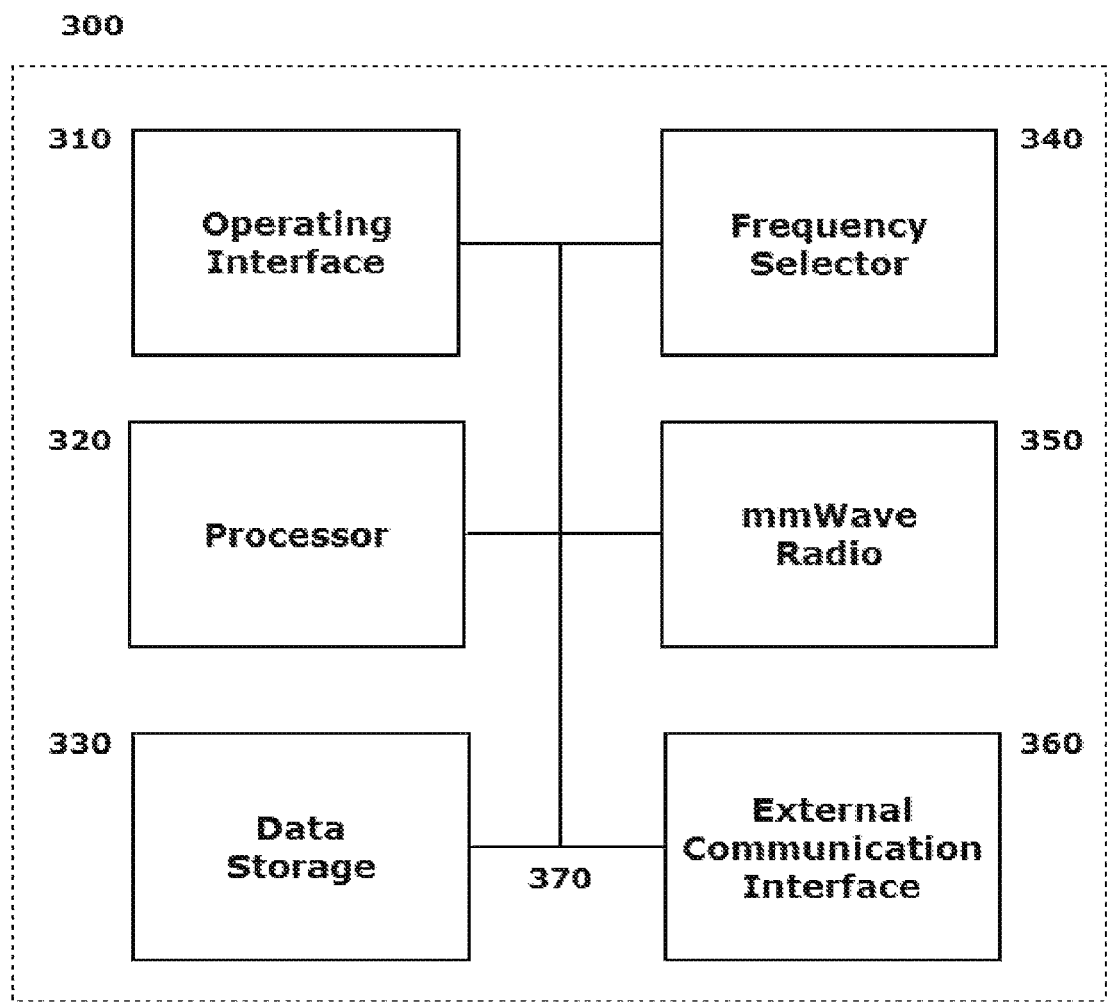
FIG. 3 illustrates a block diagram of an exemplary mmWave transmitter/receiver device usable with the systems and methods according to this disclosure.

FIG. 3 illustrates a block diagram of an exemplary mmWave transmitter/receiver device 300 usable with the systems and methods according to this disclosure. The exemplary mmWave transmitter/receiver device 300 may be in either a CPU core side or a bus interface side of a mmWave wireless communication link.

The exemplary mmWave transmitter/receiver device 300 may include an operating interface 310 by which the mmWave transmitter/receiver device 300 may be manually operated by a user, or automatically operated by the system with which it is installed according to instructions that may be input to and interpreted by the mmWave transmitter/receiver device 300. The operating interface 310 may perform such simple functions as turning on and off the mmWave transmitter/receiver device 300 at appropriate times, or otherwise performing higher level functions such as, for example, in a frequency agile system, selecting from among a number of sub-carriers to ensure interference free operation from another mmWave transmitter/receiver device 300 operating in very close proximity.

The mmWave transmitter/receiver device 300 may include one or more local processors 320 for individually undertaking determination processes that are carried out by the mmWave transmitter/receiver device 300. The processor(s) 320 may carry out processing and control functions for directing establishing and maintaining a mmWave communication link with a cooperating mmWave transmitter/receiver device 300 to provide wireless communication between a port in a wireless bus interface and a CPU core to facilitate the inter-core communication and communication testing. Processor(s) 330 may include at least one conventional processor or microprocessor that interprets and implements instructions to make the determinations appropriate to carrying into effect the communications discussed in this disclosure.

The mmWave transmitter/receiver device 300 may include one or more data storage devices 330. Such data storage device(s) 330 may be used to limitedly store data or operating programs as may be appropriate for use in the mmWave transmitter/receiver device 300, and specifically the processor(s) 320. Data storage device(s) 330 may include a random access memory (RAM) or another type of dynamic storage device that stores information and instructions for execution by the processor(s) 320. Data storage device(s) 330 may also include a read-only memory (ROM), which may include a conventional ROM device or another type of static storage device that stores static information and instructions for the processor(s) 320. In these installations, the data storage device(s) 330 may be provided as integral components of the mmWave transmitter/receiver device 300 or otherwise may be provided external to, and in wired or wireless communication with, mmWave transmitter/receiver device 300 such as, for example, in communication with the CPU core or the wireless bus interface which the mmWave transmitter/receiver device 300 supports and accessible via the operating interface 310 or other external communication interface 360 as discussed briefly below.

The mmWave transmitter/receiver device 300 may include at least one frequency selector 340. The frequency selector 340 may be a manually operated device or an automatically operated module by which separate subcarrier frequencies, for example, may be selectable to attempt to ensure overall interference-free operation between closely adjacent beamformed mmWave wireless communication links. The frequency selector 340 may allow for a specific subcarrier to be separately preset for each of adjoining pairs of devices in an overall inter-core communication system according to this disclosure.

The mmWave transmitter/receiver device 300 may also include a mmWave radio component 350 as the actual communicating device to facilitate the wireless communication between one of the bus interface side and the CPU side of each wireless communication link and the other.

The mmWave transmitter/receiver device 300 may include one or more external data communication interfaces 360 by which the mmWave transmitter/receiver device 300 may communicate with components of the system within which it is installed to receive data to be transmitted across the wireless communication link once established. Such external data communication interface 360 may be available to report from mmWave transmitter/receiver device 300 to the system within which the mmWave transmitter/receiver device 300 is installed information, for example, on the fidelity of the wireless communication link and the ability of the wireless communication link to send and receive information between cooperating mmWave transmitter/receiver devices 300 on each of the bus interface side and the CPU core side of the wireless communication link.

All of the various components of the mmWave transmitter/receiver device 300, as depicted in FIG. 3, may be connected by one or more data/control busses 37. The data/control bus(ses) 370 may provide internal wired communication between the various components of the mmWave transmitter/receiver device 300, whether all of those components are housed integrally as a single unit or are otherwise connected to and in communication with each other.

It should be appreciated that, although depicted in FIG. 3 as an integral unit, the various disclosed elements of the mmWave transmitter/receiver device 300 may be arranged in any combination of sub-systems as individual components or combinations of components, integral to a single unit, or external to, and in communication with the single unit. In other words, no specific configuration as an integral unit or as a support unit, for the mmWave transmitter/receiver device 300 is to be implied by the depiction in FIG. 3. Further, as noted above, certain of the functions described may actually he housed in or carried out by components of the system that the mmWave transmitter/receiver device 300 supports for inter-core communication.

The disclosed embodiments may include a method for employing mmWave radios for inter-processor or inter-core communication in multi-core computing systems. The method may include equipping individual CPU cores for use in a multi-core computing system each with a mmWave transmitter/receiver. The method may include equipping individual ports in a bus interface in a multi-core computing system each with a mmWave transmitter/receiver. The core side mmWave transmitters/receivers may then be positioned opposite the bus interface side mmWave transmitters/receivers. Individual wireless communication links may then be established between cooperating pairs of core side mmWave transmitters/receivers and bus interface side. An inter-core communication scheme across the multiply established wireless communication links may then be undertaken for operation or for testing.

Figure 4:
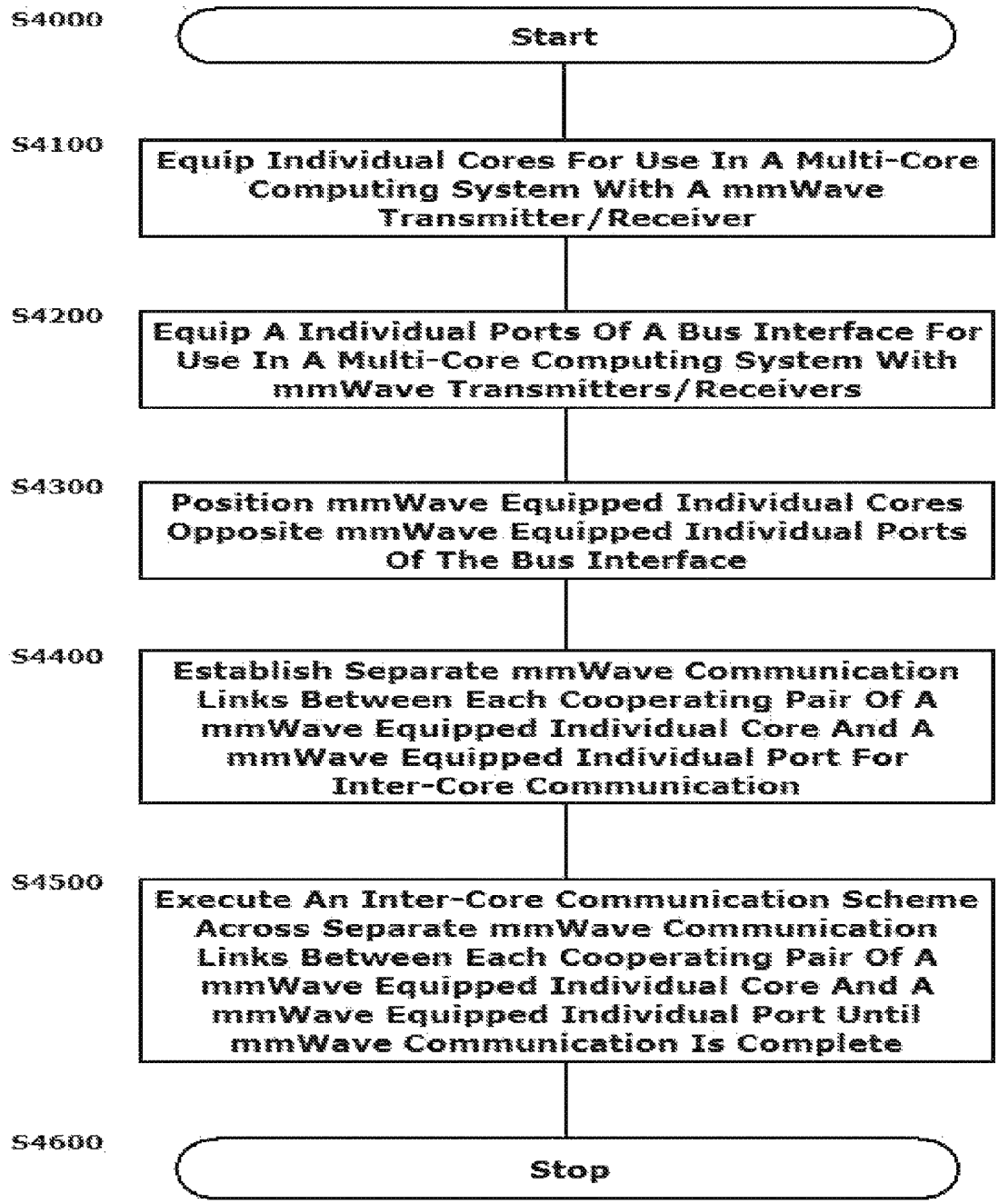
FIG. 4 illustrates a flowchart of an exemplary method for employing mmWave radios for inter-processor or inter-core communication in multi-core computing systems according to this disclosure.

FIG. 4 illustrates a flowchart of an exemplary method for employing mmWave radios for inter-processor or inter-core communication in multi-core computing systems according to this disclosure. As shown in FIG. 4, operation of the method commences at Step S4000 and proceeds to Step S4100.

In Step S4100, individual mmWave transmitters/receivers may be associated with each of the multiple CPU cores in a multi-core computing system. Operation of the method proceeds to Step S4200.

In Step S4200, individual mmWave transmitters/receivers may be associated with each of the multiple ports in a bus interface in a multi-core computing system. Operation of the method proceeds to Step S4300.

In Step S4300, core side mmWave transmitters/receivers and bus interface side mmWave transmitters/receivers may be positioned opposite one another, or in any manner that will facilitate direct beamformed wireless communication between corresponding pairs of core side and bus interface side mmWave transmitters/receivers. Operation of the method proceeds to Step S4400.

In Step S4400, beamformed directional wireless communication links are established between cooperating pairs of core side and bus interface side mmWave transmitters/receivers in order to provide individual and interference free communication separately between individual ports in the bus interface and individually supported CPU cores. Operation of the method proceeds to S4500.

In Step S4500, direct wireless communication is conducted over the multiple established beamformed directional wireless communication links to support inter-core communication for operation of a system or for testing of the inter-core communication scheme. Operation of the method proceeds to step S4600 where operation of the method ceases.

The disclosed embodiments may include a non-transitory computer-readable medium storing instructions which, when executed by a processor, may cause the processor to execute the steps of the method outlined, and as described in detail, above.

The above-described exemplary systems and methods reference certain conventional computing and signal transmitting/receiving components to provide a brief, general description of a suitable communication and processing environment in which the subject matter of this disclosure may be implemented for familiarity and ease of understanding. Although not required, embodiments of the disclosure may be provided, at least in part, in a form of hardware circuits, firmware or software computer-executable instructions to carry out the specific functions described.

Those skilled in the art will appreciate that other embodiments of the separate from those specifically disclosed may be practiced using the concepts described above and such embodiments should reasonably be considered to be encompassed in the above discussion.

Embodiments may also be practiced in distributed network computing environments where tasks are performed by local and remote processing devices, generally as outlined above, that are linked to each other by hardwired links, wireless links, or a combination of both through the computing network.

Embodiments within the scope of the present disclosure may include computer-readable media having stored computer-executable instructions or data structures that can be accessed, read and executed by an appropriate processor. Such computer-readable media can be any available media that can be accessed by the processor in, or in communication with, the monitored communication link. By way of example, and not limitation, such computer-readable media can comprise RAM, ROM, EEPROM, CD-ROM, flash drives, data memory cards or other analog or digital data storage device that can be used to carry or store desired program elements or steps in the form of accessible computer-executable instructions or data structures. When information is transferred or provided over a network or another communications connection the receiving processor properly views the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause a processor to perform certain of the above-specified functions, individually, or in combination. Computer-executable instructions also include program modules that are remotely stored for access by a processor to be executed by the processor when the processor is caused to communicate in a network environment. The exemplary depicted sequence of executable instructions or associated data structures represents one example of a corresponding sequence of acts for implementing the functions described in the steps. The steps of the exemplary methods, as depicted, are not intended to imply any particular order to the depicted steps except as may be necessarily inferred when one of the depicted steps is a necessary precedential condition to accomplishing another of the depicted steps.

Although the above description may contain specific details, they should not be construed as limiting the claims in any way. Other configurations of the described embodiments of the disclosed systems and methods are part of the scope of this disclosure. Accordingly, the appended claims and their legal equivalents should only define the disclosure, rather than any specific examples given.

We claim:

1. A method for implementing inter-processor communication, comprising:
   pairing a first plurality directional wireless transmitters/receivers individually connected to a plurality of CPU cores with a cooperating second plurality of directional wireless transmitters/receivers individually connected to a plurality of ports in a bus interface: and
   implementing, with a processor, an inter-processor communication scheme between the plurality of CPU cores via a plurality of individual wireless communication links established between cooperating pairs of the first plurality of CPU core-connected directional wireless transmitters/receivers and the second plurality of interface port-connected directional wireless transmitters/receivers;
   wherein inter-processor communication is selectively done through mmWave radios operating at a same frequency or at a different frequency;
   wherein the plurality of individual wireless communication links supporting data transmission rates greater than 6 Gbps;
   wherein sub-carrier frequencies for the plurality of individual wireless communication links being individually selectable.

2. The method of claim 1, the respective the first plurality of CPU core-connected directional wireless transmitters/receivers and the second plurality of interface port-connected directional wireless transmitters/receivers being mmWave transmitters/receivers.

3. The method of claim 2, the mmWave transmitters/receivers operating in the 60 GHz frequency range.

4. The method of claim 1, the first plurality directional wireless transmitters/receivers being individually connected to the plurality of CPU cores via individual wired connections.

5. The method of claim 1, the second plurality directional wireless transmitters/receivers being individually connected to the plurality of ports in the bus interface via individual wired connections.

6. The method of claim 1, the inter-processor communication scheme being implemented in an operating multi-core computing system.

7. The method of claim 1, the inter-processor communication scheme be implemented for testing of a multi-core computing system.

8. The method of claim 1, further comprising monitoring characteristics of the plurality of individual wireless communication links.

9. A system for implementing inter-processor communication, comprising:
   a first plurality directional wireless transmitters/receivers individually connected to a plurality of CPU cores:
   a second plurality of directional wireless transmitters/receivers individually connected to a plurality of ports in a bus interface: and
   a processor that is programmed to implement an inter-processor communication scheme between the plurality of CPU cores via a plurality of individual wireless communication links established between cooperating pairs of the first plurality of CPU core-connected directional wireless transmitters/receivers and the second plurality of interface port-connected directional wireless transmitters/receivers;
   wherein inter-processor communication is selectively done through mmWave radios operating at a same frequency or at a different frequency;
   wherein the plurality of individual wireless communication links supporting data transmission rates greater than 6 Gbps;
   wherein sub-carrier frequencies for the plurality of individual wireless communication links being individually selectable for the cooperating pairs of the CPU core-connected directional wireless transmitters/receivers and the interface port-connected directional wireless transmitters/receivers.

10. The system of claim 9, the first plurality of directional wireless transmitters/receivers and the second plurality of directional wireless transmitters/receivers being mmWave transmitters/receivers.

11. The system of claim 10, the mmWave transmitters/receivers operating in the 60 GHz frequency range.

12. The system of claim 9, the first plurality directional wireless transmitters/receivers being individually connected to the plurality of CPU cores via individual wired connections.

13. The system of claim 9, the second plurality directional wireless transmitters/receivers being individually connected to the plurality of ports in the bus interface via individual wired connections.

14. The system of claim 9, the processor implementing the inter-processor communication scheme in an operating multi-core computing system in which the first plurality directional wireless transmitters/receivers, the plurality of CPU cores, the second plurality of directional wireless transmitters/receivers, the bus interface and the processor are installed.

15. The system of claim 9, the processor implementing the inter-processor communication scheme to test a multi-core computing system in a test apparatus, the test apparatus including the first plurality directional wireless transmitters/receivers, the plurality of CPU cores, the second plurality of directional wireless transmitters/receivers, the bus interface and the processor.

16. A non-transitory computer-readable medium storing computer-readable instructions which, when executed by a processor, cause the processor to execute a method for implementing inter-processor communication, comprising:

pairing a first plurality directional wireless transmitters/receivers individually connected to a plurality of CPU cores with a cooperating second plurality of directional wireless transmitters/receivers individually connected to a plurality of ports in a bus interface: and implementing an inter-processor communication scheme between the plurality of CPU cores via a plurality of individual wireless communication links established between cooperating pairs of the first plurality of CPU core-connected directional wireless transmitters/receivers and the second plurality of interface port-connected directional wireless transmitters/receivers;

wherein inter-processor communication is selectively done through mmWave radios operating at a same frequency or at a different frequency;

wherein the plurality of individual wireless communication links supporting data transmission rates greater than 6 Gbps;

wherein sub-carrier frequencies for the plurality of individual wireless communication links being individually selectable for the cooperating pairs of the CPU core-connected directional wireless transmitters/receivers and the interface port-connected directional wireless transmitters/receivers.

* * * * *